Oct. 6, 1964
C. W. COWLEY ETAL
3,151,760
CONTAINER FOR THE LOW TEMPERATURE PRESERVATION
OF BIOLOGICAL SUBSTANCES
Filed Dec. 27, 1960
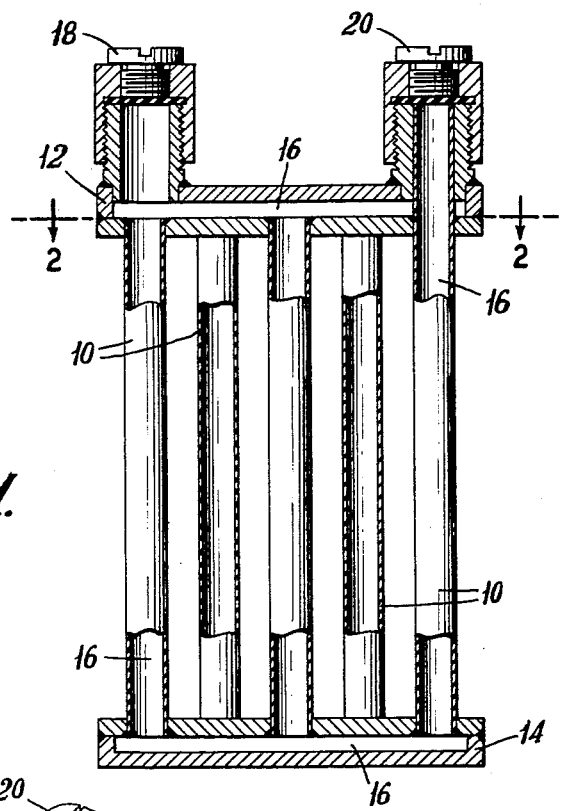
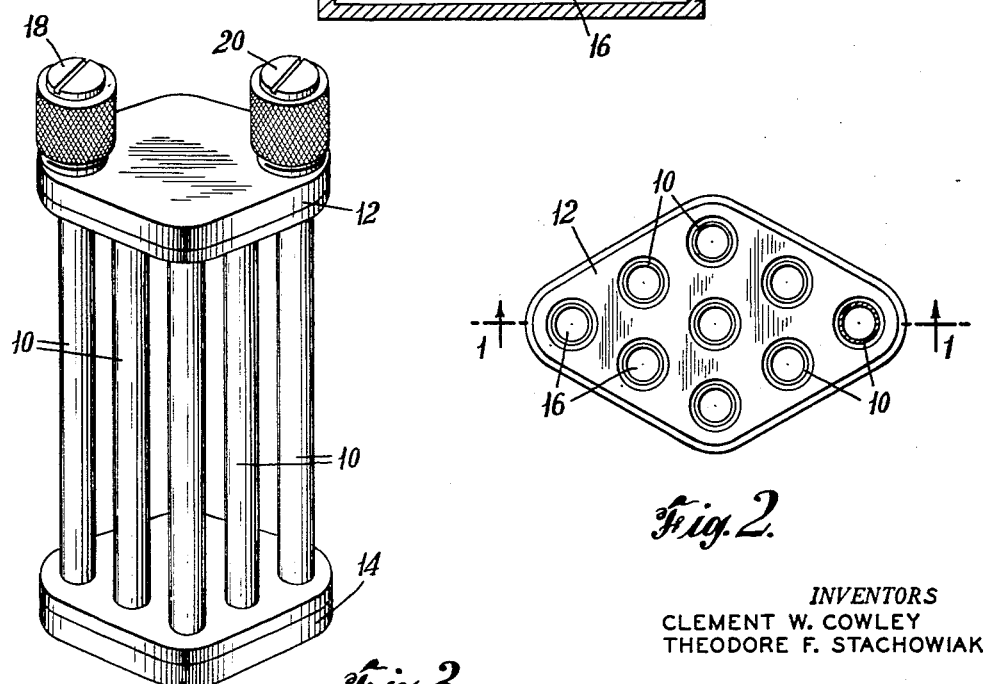
INVENTORS
CLEMENT W. COWLEY
THEODORE F. STACHOWIAK
BY William F. Mesinger
ATTORNEY

United States Patent Office 3,151,760
Patented Oct. 6, 1964

3,151,760
CONTAINER FOR THE LOW TEMPERATURE PRESERVATION OF BIOLOGICAL SUBSTANCES
Clement W. Cowley, Tonawanda, and Theodore F. Stachowiak, Kenmore, N.Y., assignors to Union Carbide Corporation, a corporation of New York
Filed Dec. 27, 1960, Ser. No. 78,662
7 Claims. (Cl. 220—20)

This invention relates to the art of low temperature preservation of biological substances. More particularly, this invention relates to a container for rapid cooling, storage and rapid warming of biological substances such as blood, bone marrow, other suspensions of cells and biological fluids.

The preservation of biological substances from degradation on storing has been a constant problem facing scientists. The problem has been especially acute in the case of blood. The maintenance of blood banks and the desirability of storing whole blood as well as other physiologically important substances in quantities for use in the event of catastrophe has made imperative the need for sterile, efficient containers suitable for freezing, storage, and thawing of these substances.

It has been postulated that suitable long term storage may be achieved at temperatures sufficiently low to inhibit biological and chemical activity of the substance stored. Such low temperature storage, however, presents a large number of problems among which are provisions for favorable heat transfer characteristics, ease of sterilization and recovery of essentially undamaged contents after storage. Furthermore, the materials of construction for such containers are limited to those that are easily sterilizable, capable of maintaining sterility, and that are non-toxic to the biological substances stored.

In the case of whole blood preservation, for example, the heat transfer characteristics must be such that the whole blood contained within the container can be chilled and warmed through the critical region between about 0° C. and about —50° C. in a very short time period, usually of the order of about 10 seconds. Furthermore, the containers must be such that at least 70% of the stored red blood cells can be recovered after storage using common blood storage additives such as lactose, polyvinylpyrrolidone (PVP), acid citrate-dextrose (ACD), and the like.

It is the principal object of this invention to provide an improved and novel container for the low temperature preservation of biological substances, such as whole blood, virus preparations, bone marrow and the like.

Another object of this invention is to provide a container for the low temperature preservation of biological substances which is capable of providing favorable heat transfer characteristics, is easily sterilizable, and provides recovery of essentially undamaged contents after storage.

Other objects and advantages will be evident from the ensuing description and drawings in which:

FIG. 1 is a cross-sectional view along the line B—B' of FIG. 2 taken in elevation of a container of this invention.

FIG. 2 is a horizontal sectional view of a container of this invention taken along the line A—A' of FIG. 1.

FIG. 3 is an isometric view of the container of FIGS. 1 and 2.

According to the present invention, a container for the low temperature preservation of biological substances is provided. The container comprises a plurality of parallel tubes having the distance between the outside walls of adjacent tubes at least equal to 1.5 times the diameter of the tubes. Manifold means are provided at opposite ends of the tubes arranged so as to form an interconnected space as determined by the inside walls of the tubes and the manifolds for storing the biological substances. Sterile opening means communicating with the space above defined are also provided for the passage of the biological substances therethrough.

It has been discovered that suitable materials of construction for the containers are those providing a $K/L$ value of at least 2500, wherein $K$ is he thermal conductivity in B.t.u./(hr.)(ft.)(° F.) and $L$ is the material thickness expressed in feet. If the $K/L$ value is less than 2500, heat cannot be introduced or removed through the container walls at a sufficiently fast rate to prevent the deterioration of the biological substances. This is of paramount importance for the low temperature preservation of whole blood.

The construction material must not only provide the required $K/L$ value but, in addition, must be non-toxic to the biological substances. The order of preference of the commonly available materials is magnesium, aluminum, and stainless steel. Containers of all of these materials have been constructed in accordance with the invention. Magnesium and aluminum give essentially the same results, while stainless steel is slightly inferior, although not significantly so. The experimental data is shown in Table I below. Copper also has been tried, but was shown to be toxic. Moreover, non-metals such as plastics may be used as materials of construction provided the general requirements of rigidity, sterility, heat transfer characteristics, and the like, as herein disclosed, are satisfied. For metallic containers, wall thicknesses of from about 0.007 to about 0.050 inch have been successfully used. However, it must be understood that the minimum thickness cable of providing satisfactory structural rigidity is preferred since this provides the highest $K/L$ value.

TABLE I
*Effects of Container Materials and Degree of Filling*

| Material | Blood Sample Volume, cc. | Percent Container Capacity | Freeze Time, (sec.) | Percent Red Cell Recovery |
|---|---|---|---|---|
| Aluminum | 15 | 43 | 52 | 82.5, 86 |
|  | 30 | 86 | 54 | 75.5, 76.5 |
| Magnesium | 15 | 43 | 48 | 82, 80 |
|  | 30 | 86 | 49 | 82, 72 |
| Stainless Steel | 15 | 43 | 71 | 80, 78 |
|  | 26 | 74 | 69 | 75.5, 70 |

The containers used for data in Table II were 35 cc. containers with a glycerine-sugar coating. The freezing medium was liquid nitrogen at —196° C. and the thawing medium was water at 45° C. The shaking amplitude during thaw was 4 inches.

In the present invention for the preservation of bulk quantities of biological substances heat must be transferred through the solid walls of the storing-container to a boiling refrigerant. In addition to the proper choice of materials of construction, the rate of heat transfer may be increased manyfold by altering the temperature difference so as to place the system in an unstable or nucleate boiling region. This object is accomplished by interposing between a solid and a liquid at its boiling point, a material of sufficiently low thermal conductivity to adjust the change in temperature between the boiling surface and the liquid to a value which allows a greater heat transfer rate. The solid is desirably a metal and preferably a highly conductive metal so that the resistance to heat flow through the mass of a separating wall will be minimized.

The insulating material may be any substance which is chemically and thermally stable in the temperature range employed, and which has a lower thermal conductivity than the storing container material. The thermal conductivity of the insulating material is preferably below about 0.15 B.t.u./(hr.)(ft.)(° F.). The insulating material should be of sufficient thickness to adjust the change in temperature between the boiling surface and the saturation temperature of the liquid refrigerant to a point where more efficient heat transfer will occur. The thickness of the insulating film necessary to adjust the change in temperature between the boiling surface and the liquid refrigerant to the most efficient value is a function of its thermal conductivity and thickness and conductivity of the container wall, and the boiling characteristics of the liquid refrigerant.

To illustrate the effect of thin, insulating coatings on boiling from a solid under unsteady state conditions, aluminum cylinders 3/8 inch in diameter and 1 inch long were suddenly submerged in liquid nitrogen boiling at about −196° C. (−320° F.) with and without insulating coatings. A thermocouple was placed in the center of the aluminum cylinder and attached to a temperature recorder which recorded the temperature at the axis as a function of time. The time required to cool the aluminum cylinders from 25° C. to −196° C. was recorded. The bare cylinder required about 55 seconds to cool from 25° C. to −196° C., whereas only about 14 seconds were required to cool an identical cylinder insulated with a 0.10 mm. thickness of petroleum paraffin base.

Other insulating film coatings were applied to the aluminum cylinders and the time required to cool from 25° C. to about −196° C. in boiling liquid nitrogen recorded. The results of these experiments are shown in Table II.

TABLE II

*Time Required to Cool 3/8-in. Diameter and 1.0-in. Long Aluminum Cylinder from 25° C. to −196° C.*

| | Cooling period sec. |
|---|---|
| 1. Bare cylinder | 55 |
| 2. Knurled cylinder, no coating | 40 |
| 3. "Poxalloy" adhesive, 0.04 mm. | 40 |
| 4. "Poxalloy" adhesive, 0.023 mm. | 28 |
| 5. "Poxalloy" adhesive, 0.75 mm. | 25 |
| 6. Clear varnish, 0.04 mm. | 29 |
| 7. Clear varnish, 0.010 mm. | 20 |
| 8. Vulcanized rubber, 0.04 mm. | 26 |
| 9. Vulcanized rubber, 0.23 mm. | 15 |
| 10. House paraffin, 0.025 mm. | 36 |
| 11. House paraffin, 0.27 mm. | 23 |
| 12. House paraffin, 0.34 mm. | 26 |
| 13. Rubber paraffin, 0.028 mm. | 38 |
| 14. Rubber paraffin, 0.028 mm. | 17 |
| 15. Rubber paraffin, 0.39 in. | 19 |
| 16. Paper masking tape, 0.30 mm. | 19 |
| 17. Paper masking tape, 0.60 mm. | 32 |
| 18. Paper masking tape, 0.90 mm. | 38 |
| 19. Rubber electrician's tape, 0.16 mm. | 18 |
| 20. Rubber electrician's tape, 0.33 mm. | 26 |
| 21. Rubber electrician's tape, 0.50 mm. | 32 |
| 22. Vaseline, 0.01 mm. | 36 |
| 23. Vaseline, 0.025 mm. | 24 |
| 24. Vaseline, 0.05 mm. | 21 |
| 25. Vaseline, 0.10 mm. | 14 |
| 26. Vaseline, 0.15 mm. | 13.5 |
| 27. Vaseline, 0.20 mm. | 14 |
| 28. Vaseline, 0.25 mm. | 16 |
| 29. Vaseline, 0.37 mm. | 17 |
| 30. Vaseline, 0.45 mm. | 20 |
| 31. Asbestos, 0.25 mm. | 42 |
| 32. Asbestos, 0.95 mm. | 64 |
| 33. Sodium silicate, 0.11 mm. | 33 |
| 34. Sodium silicate, 0.17 mm. | 30 |
| 35. Kaolin, 0.11 mm. | 38 |
| 36. Plaster of Paris, 0.19 mm. | 10 |

The rapid chilling of the biological substances is achieved by immersing the containers in a cryogenic fluid bath. The fluid suitable for use in the present invention must be cold enough to freeze the biological substance and, of course, provided a temperature differential between the biological substance and the heat transfer surfaces compatible with the desired heat transfer rates. In the case of blood, for example, this means that the refrigerant must have a temperature of below about −120° C. to insure adequate recovery of the red blood cells.

Liquid nitrogen is the preferred refrigerant, since it has the advantage of being relatively inert, safe to handle, and relatively inexpensive. It also has an extremely low boiling point, namely, −196° C., at atmospheric pressure. However, other liquid refrigerants may also be used. Among those suitable are liquid air, liquid helium, liquid neon, liquid argon, liquid krypton, saturated solution of Dry Ice in methyl alcohol, and the like.

Liquid nitrogen and the other low-boiling refrigerants are saturated fluids at atmospheric pressure, and boil violently when a warm object such as the blood-storing container is plunged therein. The heat transfer is dependent upon the temperature difference, $\Delta T$, between the fluid and the warm object. At very high values of $\Delta T$, a vapor film is formed around the warm container resulting in very poor heat transfer. This vapor film becomes less and less stable as the $\Delta T$ is decreased and the heat transfer improves. At a $\Delta T$ of about 3° C. (for liquid nitrogen), maximum heat transfer is attained and drops off as the $\Delta T$ is reduced to zero. In view of this heat transfer rate-$\Delta T$ pattern, it would appear that a prohibitively low heat transfer rate would be attained when a blood storing container at 25° C. is suddenly plunged into liquid nitrogen at −196° C. However, the application of the aforedescribed coatings on the container outer walls allow the surface in contact with the liquid nitrogen to be cooled very rapidly and provide a $\Delta T$ value closer to 3° C.

In order to thaw a container of frozen blood, it is necessary to again pass through the critical temperature region from −50° C. to melting as rapidly as possible. Unfortunately there is an added limitation in that blood is rapidly and irreversibly damaged at temperatures higher than 50° C. Thus the temperature of the fluid used to perform the thawing function should not be substantially higher than this value. Water is the preferred thawing medium, but other methods such as thawing by means of radio frequency energy are also feasible.

Referring now more specifically to FIGS. 1 and 2, a container for the preservation of biological substances is illustrated. The container comprises a plurality of parallel tubes 10 having the distance between the outside walls of adjacent tubes at least equal to 1.5 times the diameter of the tubes. Manifold means 12 and 14 at opposite ends of the tubes 10 are arranged so as to form an interconnected space 16 as determined by the inside walls of the tubes and the manifold means for storing the biological substances. The container is further provided with sterile openings 18 and 20 communicating with space 16 for the passage of the biological substance therethrough. Sterile opening 20 is illustrated as attached to the extension of one of the parallel tubes 10. It should be noted that this tube is not connected to the upper manifold 12 but passes through thereby allowing the entering biological substance to pass to the lower manifold 14 and thereby fill the container. The sterile opening 18 connects with the top face of the upper manifold 12 and serves as an air tube during filling of the container. When emptying the container, the roles of the openings 18 and 20 are reversed and the filling opening 20 serves as the air tube. This arrangement, i.e., having a separate filling and emptying means, is necessary for containers having a specimen mass thickness less than about 0.4 inch in order to ensure ease of filling and emptying. For containers having a specimen mass thickness greater than about 0.4 inch, such an arrangement is optional. For these containers, the filling and emptying is usually accomplished through a confined flow passageway in direct communication with the storage space. Alternately, two openings may be provided, one serving as a breather or air tube. As used herein, "specimen mass thickness" is defined as the widest cross-section of the biological substance within the storage space.

The sterile opening means of the containers must be capable of sealing the openings during storage to prevent the refrigerant or other deleterious substances from contacting the biological substances.

In order to assure adeqaute access of the refrigerant fluid to a series of tubes connected to common manifolds as embodied in the present invention, the distance between two adjacent tubes must be equal to at least 1.5 times the diameters of the tubes. This assures adequate circulation of the heat transfer fluid. Moreover, if heat-transfer-enhancing coatings are employed on the tubes, the preferred embodiment of this invention comprises not more than three rows of tubes for each container. This restriction assures that all of the tubes of the container will be adequately coated with the heat-transfer-enhancing coatings.

The containers of this invention are particularly suitable for the low temperature preservation of biological substances that require the chilling and thawing of specimen mass thicknesses of less than about 0.4 inch. If the specimen mass thickness in a container is less than about 0.4 in., agitation does not give a noticeably different chilling or thawing rate. However, experimental work with whole blood whereby the blood was rapidly chilled and thawed has shown that agitation has a beneficial influence on blood-cell recovery after thawing for containers having a blood mass thickness greater than about 0.4 inch. Table III is a compilation of the experimental results. Moreover, it has been shown that, in order to obtain adequate agitation through shaking the container, the volume of blood inside this container must be no greater than about 60% of the total container volume.

TABLE III

*Effects of Shaking on Red Blood Cell Recovery*

| Thaw Bath Temp., ° C. | Ampl. (in.) | Time (sec.) Spent by Center Thermocouple in $-10°$ C. to $-50°$ C. Temp. Zone | | Total Time (sec.) | Percent Red Cell Recovery |
|---|---|---|---|---|---|
| | | During Freezing | During Thawing | | |
| 45 | 0 | 4 | 30 | 34 | 61 |
| 45 | 1¼ | 4 | 21 | 25 | 61 |
| 45 | 2½ | 4 | 15.5 | 19.5 | 79 |
| 45 | 4 | 4 | 15.0 | 19.0 | 83 |
| 55 | 0 | 4 | 20.4 | 24.4 | 66 |
| 55 | 1¼ | 4 | 21.2 | 25.2 | 84 |
| 55 | 2½ | 4 | 13.0 | 17.0 | 86.5 |
| 55 | 4 | 4 | 6.4 | 10.4 | 90.5 |

The frequency of shaking was 325 cycles per minute for all runs.

The containers of this invention are particularly suitable for the low temperature preservation of biological substances in volumes of about 200 cc. and less. Very effective heat transfer can be achieved with containers of this capacity without shaking. Furthermore, because of their unique construction, these containers are very rigid.

In an example of the invention a container of this invention filled with 250 cc. of whole blood diluted with an additive consisting of 10% glucose, 15% lactose, and 75% saline solution (0.85%). The container was then coated by immersion in a 400-centipoise PVP/methanol solution. The freezing was accomplished by immersion into liquid nitrogen for 55 seconds. The contents were then thawed by swirling the container in 43° C. water. Subsequent analysis indicated 76% red blood cell recovery.

While physiologically important substances such as whole blood, bone marrow, and the like, have been more fully discussed in this disclosure, the containers of this invention are by no means limited to these. These containers are also ideally suited for the freeze-preservation of other biological substances such as plasma, virus preparations, cell preparations in general, and the like.

What is claimed is:

1. A container for the low temperature preservation of biological substances which comprises in combination a plurality of parallel tubes, the distance between the outside walls of adjacent tubes being at least equal to 1.5 times the diameter of said adjacent tubes; manifold means at opposite ends of said tubes arranged so as to form an interconnected space as determined by the inside walls of said tubes and said manifold means for storing biological substances; said container having a sterile opening means communicating with said space for the passage of said biological substances therethrough, said tubes and said manifold means being constructed of a material having a K/L value greater than about 2500 wherein K is the thermal conductivity of said material in B.t.u./(hr.)(ft.)(° F.) and L is the material thickness in feet.

2. A container for the low temperature preservation of biological substances which comprises in combination a plurality of parallel tubes, the distance between the outside walls of adjacent tubes being at least equal to 1.5 times the diameter of said adjacent tubes; manifold means at opposite ends of said tubes arranged so as to form an interconnected space as determined by the inside walls of said tubes and said manifold means for storing biological substances, said space having a specimen mass thickness less than about 0.4 inch; said container having a sterile opening means communicating with said space for the passage of said biological substances therethrough, said tubes and said manifold means being constructed of a material having a K/L value greater than about 2500 wherein K is the thermal conductivity of said material in B.t.u./(hr.)(ft.)(° F.) and L is the material thickness in feet.

3. A container for the low temperature preservation of biological substances which comprises in combination a plurality of parallel tubes, the distance between the outside walls of adjacent tubes being at least equal to 1.5 times the diameter of said adjacent tubes; manifold means at opposite ends of said tubes arranged so as to form an interconnected space as determined by the inside walls of said tubes and said manifold means for storing biological substances, said space having a specimen mass thickness greater than about 0.4 inch and said biological substances occupying less than about 60% of the volume of said space; said container having a sterile opening means communicating with said space of the passage of said biological substances therethrough, said tubes and said manifold means being constructed of a material having a K/L value greater than about 2500 wherein K is the thermal conductivity of said material in B.t.u./(hr)(ft)(° F.) and L is the material thickness in feet.

4. A container as described in claim 1 wherein the container is coated with a material having a thermal conductivity below about 0.15 B.t.u./(hr.)(ft.)(° F.).

5. A container as described in claim 2 wherein the container is coated with a material having a thermal conductivity below about 0.15 B.t.u./(hr.)(ft.)(° F.).

6. A container for the low temperature preservation of biological substances which comprises in combination a plurality of parallel tubes, the distance between the outside walls of adjacent tubes being at least equal to 1.5 times the diameter of said adjacent tubes; manifold means at opposite ends of said tubes arranged so as to form an interconnected space as determined by the inside walls of said tubes and said manifold means for storing biological substances, said space having a specimen mass thickness greater than about 0.4 inch and said biological substances occupying less than about 60% of the volume of said space; said container having a sterile opening means communicating with said space for the passage of said biological substances therethrough, said tubes and said manifold means being constructed of a material having a K/L value greater than about 2500 wherein K is the thermal conductivity of said material in B.t.u./(hr.)(ft.)(° F.) and L is the material thickness in feet; and the container coated with a material having a thermal conductivity less than about 0.15 B.t.u/(hr.)-(ft.)(° F.).

7. A container as described in claim 6 wherein the biological substance is whole blood and the coating material of said container is Vaseline.

References Cited in the file of this patent

UNITED STATES PATENTS

| | | |
|---|---|---|
| 230,815 | Puffer | Aug. 3, 1880 |
| 244,762 | Paul | July 26, 1881 |
| 639,675 | Emry | Dec. 19, 1899 |
| 2,209,304 | Alder | July 30, 1940 |
| 2,611,584 | Labus | Sept. 23, 1952 |
| 2,875,588 | Berger | Mar. 3, 1959 |

FOREIGN PATENTS

| | | |
|---|---|---|
| 241,627 | Great Britain | Oct. 26, 1925 |